US010151179B2

(12) United States Patent
Greci et al.

(10) Patent No.: US 10,151,179 B2
(45) Date of Patent: Dec. 11, 2018

(54) SEALING RINGS FOR A WIRE WRAPPED SCREEN OF A SAND SCREEN ASSEMBLY

(71) Applicant: Halliburton Energy Services, Inc., Houston, TX (US)

(72) Inventors: Stephen M. Greci, Little Elm, TX (US); James Jun Kang, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 85 days.

(21) Appl. No.: 15/301,326

(22) PCT Filed: May 9, 2014

(86) PCT No.: PCT/US2014/037560
§ 371 (c)(1),
(2) Date: Sep. 30, 2016

(87) PCT Pub. No.: WO2015/171164
PCT Pub. Date: Nov. 12, 2015

(65) Prior Publication Data
US 2017/0016310 A1  Jan. 19, 2017

(51) Int. Cl.
*E21B 43/08*  (2006.01)
*B23P 11/02*  (2006.01)
*E21B 17/10*  (2006.01)

(52) U.S. Cl.
CPC .......... *E21B 43/088* (2013.01); *B23P 11/025* (2013.01); *E21B 17/1078* (2013.01); *Y10T 29/49865* (2015.01)

(58) Field of Classification Search
CPC .... E21B 43/088; E21B 17/1078; E21B 43/10; E21B 33/12; E21B 43/086; B23P 11/025; Y10T 29/49865
See application file for complete search history.

(56) References Cited

U.S. PATENT DOCUMENTS 4,378,840 A    4/1983  Lilly
5,979,551 A   11/1999  Uban et al.
(Continued)

FOREIGN PATENT DOCUMENTS

EP       1443175 A1 *  8/2004  ........... E21B 43/103

OTHER PUBLICATIONS

Singapore Search Report and Written Opinion dated Jan. 15, 2018; Singapore Patent Application No. 11201606339Y.
(Continued)

*Primary Examiner* — Jermie Cozart
(74) *Attorney, Agent, or Firm* — McGuireWoods LLP

(57) ABSTRACT

A method of installing a sealing ring onto a wire wrap screen comprising: providing the sealing ring, wherein the sealing ring has an initial inner diameter greater than the outer diameter of an end of the wire wrap screen; reducing the inner diameter of the sealing ring, wherein the reduced inner diameter of the sealing ring is less than the outer diameter of the end of the wire wrap screen; heating the sealing ring; positioning the heated sealing ring over the end of the wire wrap screen; and allowing the sealing ring to decrease in temperature. Another method comprises positioning at least two sealing rings adjacent to a cut-out section of the wire wrap screen.

23 Claims, 6 Drawing Sheets

(56) References Cited

U.S. PATENT DOCUMENTS

| | | | |
|---|---|---|---|
| 8,096,037 B2 * | 1/2012 | Ferguson | B23P 11/025 29/447 |
| 8,291,971 B2 * | 10/2012 | Lopez | E21B 43/088 166/227 |
| 2007/0023331 A1 * | 2/2007 | Laakso | D21D 5/16 209/395 |
| 2009/0229823 A1 | 9/2009 | Moen et al. | |
| 2009/0283271 A1 | 11/2009 | Langeslag | |
| 2012/0037357 A1 | 2/2012 | Lopez et al. | |
| 2012/0048536 A1 | 3/2012 | Holderman et al. | |
| 2013/0000890 A1 * | 1/2013 | Olenick | E21B 43/086 166/233 |
| 2014/0000869 A1 | 1/2014 | Holderman et al. | |

OTHER PUBLICATIONS

International Search Report and Written Opinion dated Feb. 4, 2015; International PCT Application No. PCT/US2014/037560.

* cited by examiner

SEALING RINGS FOR A WIRE WRAPPED SCREEN OF A SAND SCREEN ASSEMBLY

TECHNICAL FIELD

Sand screen assemblies can include a wire screen that is wrapped around the outside of a base pipe. Sealing rings can be used to seal the ends of the screen. Sealing rings can also be used to seal the ends of the screen near a centralizer.

BRIEF DESCRIPTION OF THE FIGURES

The features and advantages of certain embodiments will be more readily appreciated when considered in conjunction with the accompanying figures. The figures are not to be construed as limiting any of the preferred embodiments.

DETAILED DESCRIPTION

Figure 1:
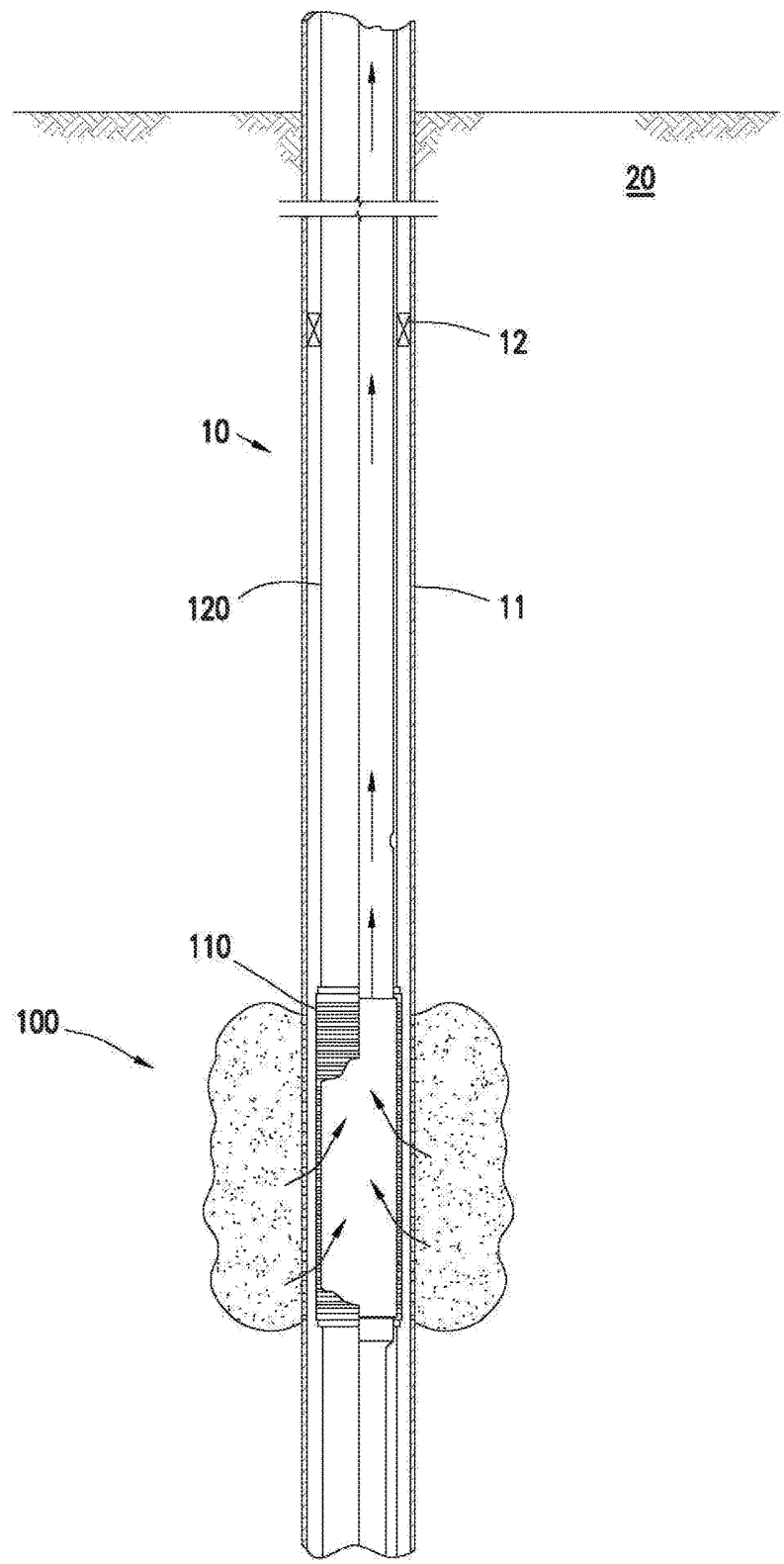
FIG. 1 is a schematic illustration of a well system containing a sand screen assembly according to certain embodiments.

As used herein, the words "comprise," "have," "include," and all grammatical variations thereof are each intended to have an open, non-limiting meaning that does not exclude additional elements or steps.

It should be understood that, as used herein, "first," "second," "third," etc., are arbitrarily assigned and are merely intended to differentiate between two or more ends, sealing rings, etc., as the case may be, and does not indicate any particular orientation or sequence. Furthermore, it is to be understood that the mere use of the term "first" does not require that there be any "second," and the mere use of the term "second" does not require that there be any "third," etc.

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas.

Oil and gas hydrocarbons are naturally occurring in some subterranean formations. In the oil and gas industry, a subterranean formation containing oil, gas, or water is referred to as a reservoir. A reservoir may be located on land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from the wellbore is called a reservoir fluid.

A well can include, without limitation, an oil, gas, or water production well, an injection well, or a geothermal well. As used herein, a "well" includes at least one wellbore. The wellbore is drilled into a subterranean formation. The subterranean formation can be a part of a reservoir or adjacent to a reservoir. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered the region within approximately 100 feet radially of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of the casing in a cased-hole wellbore; and the space between the inside of the casing and the outside of a tubing string in a cased-hole wellbore.

In unconsolidated or loosely consolidated subterranean formations (known as soft formations), fines, such as sediment and sand, can enter the tubing string during the production of oil or gas. When this occurs, several problems can arise, for example, erosion of production equipment, well plugging, decreased production of oil or gas, or production of the fines along with the oil or gas.

Sand control is often used in soft formations. Examples of sand control techniques include, but are not limited to, installing a filter in a portion of the soft formation, using slotted liners and/or screens, and gravel packing. A slotted liner can be a slotted pipe, such as a base pipe. The liner and/or screen can cause bridging of the fines against the liner or screen as oil or gas is being produced. Gravel packing is often performed in conjunction with the use of slotted liners and/or screens. Gravel is proppant having a particle-size class above sand, which is defined as having a largest dimension ranging from greater than 2 millimeters (mm) up to 64 mm. Gravel is commonly placed in a portion of an annulus between the wall of the wellbore and the outside of the screen. The gravel helps to trap fines from entering the production equipment or plugging the porous portions of the liner or screen.

There are generally two types of wire wrapped screens—a slide-on and direct wrap. The slide-on screen is a sleeve of wire wrap that is slid over the base pipe and secured once in place. A direct wrap screen is where the wire is wrapped directly onto the base pipe. The wire screen generally terminates close to the ends of each section of base pipe. In order to close the ends of the screen, a sealing ring is placed on top of the end of the screen and has a flange that can be welded against the base pipe. For an interference ring, the sealing ring will have a certain amount of diametrical interference between the exterior of the wrap wires and the inside of the sealing ring. The amount of interference is equal to the difference between the O.D. of the screen and the I.D. of the ring and will be a positive number. This interference helps to ensure a sand tight seal. The amount of interference can be predetermined. For example, it may be desirable to have a 0.02 inch (in.) interference. This would mean that the ring has an I.D. that is 0.02 in. less than the O.D. of the screen.

In order to install a sealing ring that has a smaller inner diameter than the screen it is to be installed on (i.e., there is some interference), the ring needs to be heated, causing it to grow in diameter. An equation can be used to make sure that the ring will grow enough in diameter to fit over the end of the screen. The amount of diametrical growth possible ($\Delta$I.D.) can be calculated using the following equation:

$$\Delta I.D.=\alpha*I.D.*\Delta T$$

where $\alpha$ is the coefficient of thermal expansion for the particular material that the sealing ring is made from, I.D. is the room temperature inner diameter of the ring, $\Delta$I.D. is the change in the inner diameter of the sealing ring once at the final temperature, and $\Delta T$ is the increase in temperature above 71° F. (22° C.) that the ring is heated. For example if the ring is heated to a final temperature of 600° F. (316° C.), then the $\Delta T$ would be 529° F. (276° C.). Of course one can select the desired amount of diametrical growth of a particular ring by varying the $\Delta T$. As such, when a ring is heated to $\Delta T$ above room temperature, the ring will expand, and when the ring cools, the ring will shrink back down to the original I.D. before heating. In this manner, a ring that initially cannot fit over another object can be heated to a sufficiently high temperature such that the ring expands and is now capable of fitting over the object. Once in place, the ring can be allowed to cool down, thus causing the ring to shrink back to its original size. The ring will now apply an amount of pressure or sealing capability to the object. The diametrical growth equation can be used to determine if the predetermined amount of interference can be achieved. For example, if the predetermined amount of interference is 0.02 in., then the $\Delta$I.D. would have to be at least 0.02 in. in order for the I.D. of the ring to increase enough to fit over the screen.

Generally, the outer diameter (O.D.) of the base pipe and screen can vary and will not be uniform. Therefore, a typical sequence of placing a sealing ring onto the end of a wire wrap screen is as follows: complete the wrapping of the wire wrap screen; the O.D. of screen is then measured; the I.D. of the ring is then lathe-cut or turned until the I.D. of the ring equals the O.D. of the screen minus the predetermined interference for the sealing ring. The ring is then heated, placed over the end of the screen, and then allowed to cool down. Needless to say, this process can be quite time consuming and disruptive to the manufacturing work flow. Moreover, the lathe-cutting must be very accurate in order for the ring to fit over the end of the screen and the desired interference achieved.

Another common issue with direct wrapped screens is the installation of a centralizer or other devices in between screen sections. Sections of base pipe and screen can be up to approximately 40 feet in length. A centralizer can function to provide structural support and centralization in the wellbore at one or more locations along the length of the sand screen assembly. The centralizer can be placed at a desired location between the ends of the screen and secured to the base pipe. A section of the screen must be absent so the centralizer can be structurally attached to the base pipe. In order to install the centralizer between 2 screen sections, the direct wrapping of the screen onto the base pipe must stop. A sealing ring is then installed on the end of the screen and a second ring is slid onto the base pipe. The wrapping commences a few inches from where the screen stopped and the second ring is then installed onto the new end of the screen. The centralizer can then be installed onto the base pipe after the 2 sealing rings and other structural components are installed.

However, several problems can arise during this process. First, it is very time consuming and costly to stop and start the direct screen wrapping process. Second, the distance between the second sealing ring and the start of wrapping varies between wrapping machines which can create longer than acceptable "dead zones" (areas on the joint without screen coverage). Thirdly, the O.D. of the new end of screen (that is formed when the wrapping process resumes) is an estimate because until the end is created, the O.D. is unknown. Therefore, the I.D. of the second sealing ring may not have been lathe-cut to the correct dimensions. If this happens, or the installation of the sealing ring is unsuccessful, then the new part of screen must be stripped from the base pipe, the second ring cut off the pipe, a new ring placed onto the pipe, and the wrapping process is resumed. Obviously this can be very costly in terms of time, money, and waste.

Currently, there is no way to install end sealing rings without having to possibly lathe-cut the I.D. of the ring to fit the O.D. of the screen or crimp the ring directly onto the screen. Nor is there a way to produce a completely wrapped screen and then go back and shrink fit sealing rings for a centralizer. Thus, there is a need for improved methods of placing shrink fit sealing rings on the ends of a wrap screen and at any location along the length of the screen. There is a need for improved methods that are more economical and reduce time and waste.

It has been discovered that thermally-installed shrink fit, sealing rings can be made to fit over the outside of a wire wrap screen. One advantage to this new method is that the sealing ring does not have to be lathe-cut to fit onto the sand screen assembly because the I.D. of the ring is already greater than the O.D. of the screen.

According to an embodiment, a method of installing a sealing ring onto a wire wrap screen comprising: providing the sealing ring, wherein the sealing ring has an initial inner diameter greater than the outer diameter of an end of the wire wrap screen and wherein the wire wrap screen is positioned around the outside of a base pipe; reducing the inner diameter of the sealing ring, wherein the reduced inner diameter of the sealing ring is less than the outer diameter of the end of the wire wrap screen; heating the sealing ring; positioning the heated sealing ring over the end of the wire wrap screen; and allowing the sealing ring to decrease in temperature.

Any discussion of the sand control assembly, or any component of the sand control assembly (e.g., a sealing ring) is intended to apply to all of the method embodiments.

Turning to the Figures, FIG. 1 depicts a well system 10. The well system 10 can include at least one wellbore 11. The wellbore 11 can penetrate a subterranean formation 20. The subterranean formation 20 can be a portion of a reservoir or adjacent to a reservoir. The wellbore 11 can include a casing (not shown). The wellbore 11 can include only a generally vertical wellbore section or can include only a generally horizontal wellbore section. One or more tubing strings, for example, a production tubing string can be installed in the wellbore 11. The tubing string can provide a conduit for fluids to travel from the formation to the surface of the wellbore 11 or vice versa. One or more packers 12 can be installed in the wellbore 11. The packers 12 can be used to create one or more wellbore intervals, wherein each wellbore interval can correspond to a different subterranean formation zone.

It should be noted that the well system 10 illustrated in the drawings and described herein is merely one example of a wide variety of well systems in which the principles of this disclosure can be utilized. For instance, the wellbore 11 can have a horizontal section and a vertical section. It should be clearly understood that the principles of this disclosure are not limited to any of the details of the well system 10, or components thereof, depicted in the drawings or described herein. Furthermore, the well system 10 can include other components not depicted in the drawings. For example, the well system can include cement in addition to, or instead of, the packers.

A sand screen assembly 100 can be run into the wellbore 11. The sand screen assembly 100 can be used for a variety of oil and gas operations. For example, the assembly can be used for producing a reservoir fluid from the subterranean formation 20. The sand screen assembly 100 can also be used as part of a gravel pack operation. The sand screen assembly 100 includes at least a base pipe 120 and a wire wrap screen 110.

FIGS. 2-6 discuss certain embodiments of the wire wrap screen prior to installation within the wellbore 11. As can be seen in the Figures, the base pipe 120 can be non-perforated or it can contain perforations or slots. For example, the base pipe 120 can be a slotted liner. The base pipe 120 can be a variety of lengths that range from about 5 feet up to 40 feet or longer. The wire wrap screen 110 is positioned around the outside of the base pipe 120. Preferably, the screen is a direct wrap screen (i.e., the screen is wrapped directly onto the base pipe instead of being pre-wrapped and slid onto the base pipe as a sleeve). According to certain embodiments, both the base pipe 120 and the wire wrap screen 110 are tubular in shape. The wire wrap screen 110 can have a length that is less than the base pipe 120. The wire wrap screen 110 can have a first end 110*a* and a second end 110*b*.

It is often desirable to seal the ends of a wire wrap screen to maintain fluid flow through the screen and into a perforated base pipe. The methods include providing a sealing ring 130. The sealing ring 130 can be made from a variety of materials including for example, metals and metal alloys. As discussed above, the sealing ring 130 will have a particular amount of diametrical growth based in part on the exact material that makes up the sealing ring. Therefore, it may be desirable to select the material making up the sealing ring 130 based on the desired amount of interference and the exact diametrical growth required for installation. Of course the increase in temperature (ΔT) above ambient temperature will also affect the amount of diametrical growth for a particular material and inner diameter (I.D.). Accordingly, the material can be selected, the ΔT can be selected, and the interference (i.e., the difference between the I.D. of the sealing ring and the O.D. of the screen) can be selected such that the required amount of diametrical growth is achieved. The material can also be selected based on other desired properties, for example, strength.

The sealing ring 130 can be circular in shape and have an I.D. and an outer diameter (O.D.). The sealing ring 130 will have a thickness, which is the difference between the O.D. and the I.D. The thickness of the sealing ring 130 can vary and according to certain embodiments, can be selected to achieve desired properties. Regardless of the O.D. and thickness of the ring, the sealing ring 130 has an initial I.D. greater than the O.D. of an end (e.g., the first end 110*a* or the second end 110*b*) of the wire wrap screen 110. The O.D. of the wire wrap screen 110 can vary along the length of the screen and base pipe assembly. Preferably, the I.D. of the sealing ring is made to be greater than all of the potential O.D.s of a screen. In this manner, the I.D. of the ring will always be greater than any screen O.D. that may be encountered.

The methods also include reducing the I.D. of the sealing ring 130. The step of reducing is performed prior to installation of the sealing ring onto the wire wrap screen 110. The step of reducing can further comprise placing the sealing ring 130 into a re-sizing device (not shown in FIG. 2). There are a variety of re-sizing devices available, and one of ordinary skill in the art will be able to select the particular re-sizing device based on needs and other factors. The re-sizing device can apply a pressure to the outside of the sealing ring 130, which reduces the O.D. and I.D. of the ring. Preferably, the pressure that is applied is uniformly applied to the outer surfaces of the ring. This uniform pressure can help the ring maintain the ring's pre-sized geometric configuration. For example, if the ring is circular in shape prior to re-sizing, then a uniform pressure can help maintain the circular shape during re-sizing as opposed to creating an egg-shaped or oval-shaped ring. The re-sizing device can be programmed or set to re-size the sealing ring to a specified I.D.

After re-sizing, the reduced I.D. of the sealing ring 130 is less than the O.D. of the end of the wire wrap screen 110. The methods can further include the step of predetermining the amount of interference between the sealing ring and the end of the screen. According to certain embodiments, the reduced I.D. of the sealing ring is equal to the O.D. of the end of the wire wrap screen 110 minus the predetermined amount of interference. By way of example, the reduced I.D. of the sealing ring 130 could be equal to 6.860 in., which is a screen O.D. of 6.880 in. minus a predetermined interference of 0.020 in. Accordingly, the re-sizing device can be set to reduce the I.D. of the sealing ring 130 to 6.860 in. The methods can further include the step of measuring the O.D. of the end of the wire wrap screen 110. The methods can further include the step of calculating the amount of diametrical growth of the sealing ring 130. The calculation of the amount of diametrical growth can be used to ensure that the I.D. of the ring will expand by at least the amount required for positioning over the end of the screen, which can be based in part on the predetermined amount of interference. The methods can further include calculating the difference between the measured O.D. of the end of the screen and the amount of interference in order to determine the reduced I.D. of the sealing ring. It should be understood that due to minor variations in the wrapping process and/or manufacture of the base pipe, that the ends (e.g., the first end 110*a* and second end 110*b*) can have different outer diameters. Therefore, each end may need to be measured in order to determine what the reduced I.D. of the ring will need to be.

After the I.D. of the sealing ring 130 is reduced the sealing ring is incapable of fitting over the end of the wire wrap screen 110. The methods further include heating the sealing ring 130. The step of heating can be performed after the step of reducing the I.D. of the ring. According to certain embodiments, the sealing ring 130 is heated to a final temperature that is based on the ΔT of the equation used to calculate the amount of diametrical growth of the ring. For example, the ΔT might be selected to be 500° F. (260° C.). This means that the sealing ring 130 would be heated to a final temperature of 571° F. (299° C.) because the ΔT is the increase in temperature above ambient temperature (i.e., 71° F. (22° C.)). The heating can cause the sealing ring 130 to expand. The expansion can increase the O.D. and I.D. of the sealing ring 130. Preferably, the amount of expansion is at least sufficient such that the sealing ring 130 is capable of being positioned over the end of the wire wrap screen 110, wherein the sealing ring 130 completely surrounds the outside of the end of the screen. The sealing ring 130 can be heated using a variety of techniques, for example, via a blowtorch, acetylene torch, heat blankets, or induction heating coils.

The methods also include positioning the heated sealing ring 130 over the end of the wire wrap screen 110. It is to be understood that the sealing ring may experience a small decrease in temperature prior to and/or during the step of positioning; however, any decrease in temperature should not be so great as to cause the I.D. of the ring to decrease enough that the ring is incapable of being positioned over the end of the screen. After positioning, the sealing ring 130 can completely surround the outside of the end of the wire wrap screen 110. A portion of the sealing ring 130 can protrude over the end of the wire wrap screen 110 and be located directly above the end of the base pipe 120. According to certain embodiments, the re-sizing device can be used to compress the protruding portion of the sealing ring 130 to at least partially close the gap on the outside of the base pipe 120. The compressed portion can then be welded onto the base pipe 120 to create a seal. As used herein, the term "seal" means a contact between two components that substantially inhibits or prevents particulate flow through the seal area. According to certain other embodiments, the sealing ring 130 can include a flanged portion that is located directly above the end of the base pipe 120 after the heated sealing ring 130 has been positioned. The flanged portion can be welded onto the end of the base pipe 120 to create a seal.

The methods further include allowing the sealing ring 130 to decrease in temperature. The decrease in temperature can be called cooling of the ring. The step of allowing can be performed after the step of positioning. Preferably, the temperature is decreased to ambient temperature. The O.D. and I.D. of the sealing ring 130 can decrease during the cooling of the ring. Preferably, the decrease in I.D. is at least sufficient such that after the ring has decreased in temperature (cooled down), the inside of the sealing ring comes in contact with the outside of the end of the wire wrap screen 110. More preferably, the decrease in I.D. of the sealing ring is sufficient to create a seal between the inside of the ring and the outside of the screen.

It is to be understood that the preceding discussion regarding the re-sizing device, the amount of interference, the heating of the ring, etc. is meant to apply to all the method embodiments without the need to repeat the different embodiments for all the methods. For example, if a discussion below references "heating the sealing ring," then all of the embodiments discussed above regarding heating of the ring are meant to apply.

According to other embodiments, a method of installing sealing rings onto the wire wrap screen comprises: providing a jacket of wire wrap screen, wherein the jacket of screen is positioned around the outside of a base pipe, and wherein the jacket of screen initially has only a first and second end; removing at least one section of the wire wrap screen from around the outside of the base pipe at a location between the first and second ends, wherein removal of the section of screen creates a re-sizing area, a third end, and a fourth end, wherein the re-sizing area is located between the third and fourth ends; providing a first and second sealing ring, wherein the first and second sealing rings have an initial inner diameter greater than the outer diameter of the wire wrap screen; positioning the first and second sealing rings onto the first end of the wire wrap screen, wherein the sealing rings completely surround the outside of the wire wrap screen after positioning; moving the first and second sealing rings along a longitudinal axis of the wire wrap screen to a location within the re-sizing area; reducing the inner diameter of the first and second sealing rings, wherein the reduced inner diameter is less than the outer diameter of the third and fourth ends of the wire wrap screen; heating the first and second sealing rings; positioning the first heated sealing ring over the third end of the wire wrap screen and the second heated sealing ring over the fourth end of the wire wrap screen; and allowing the first and second sealing rings to decrease in temperature.

Figure 2:
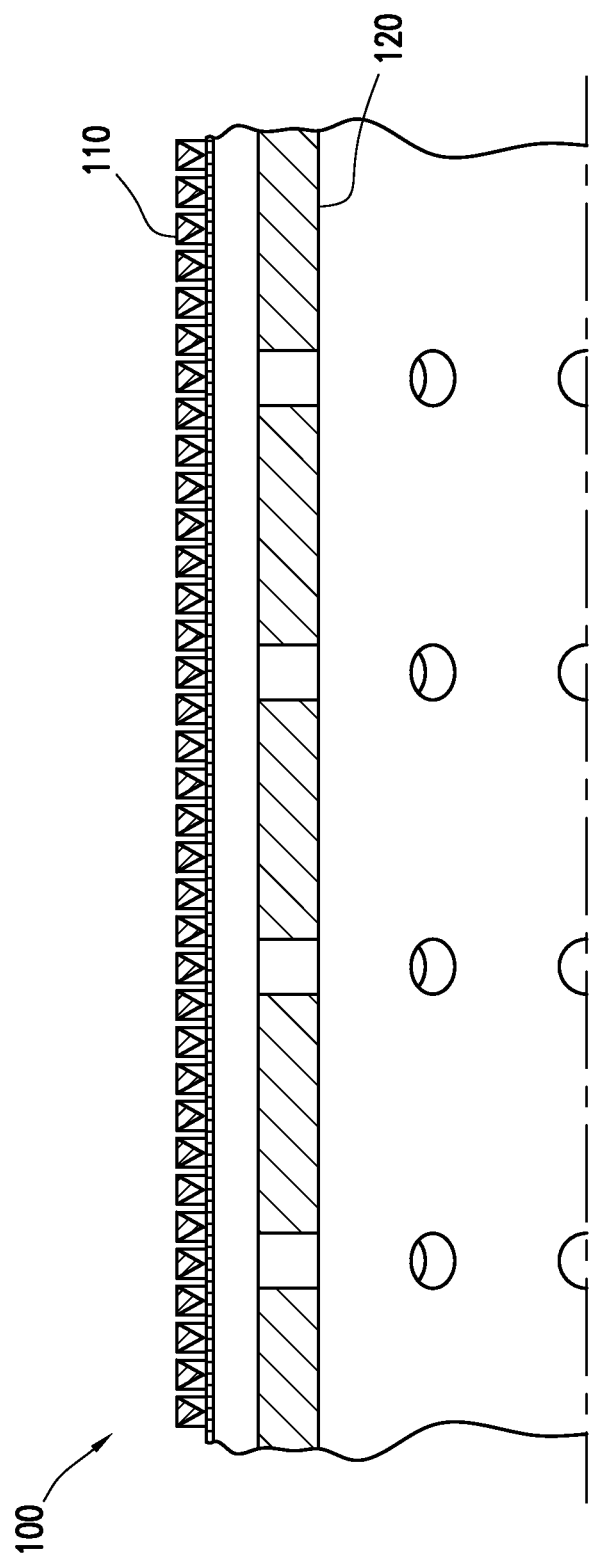
FIG. 2 is a cross-sectional view of a base pipe and wrap screen of the sand screen assembly.

FIGS. 2-6 depict these other embodiments. As can be seen in FIG. 2, the wire wrap screen 110 can be directly wrapped onto the base pipe 120 to form the jacket. As used herein, the term "jacket" means a continuous wrap of screen. Although not depicted in FIG. 2, the first end 110a and second end 110b of the jacket of screen can include two sealing rings (discussed above). The jacket of screen initially has only the first end 110a and second end 110b. The jacket can have a length that is less than the length of the base pipe 120, preferably each end of the jacket is not less than 12 in. from the ends of the base pipe to allow for handling room.

Figure 3:
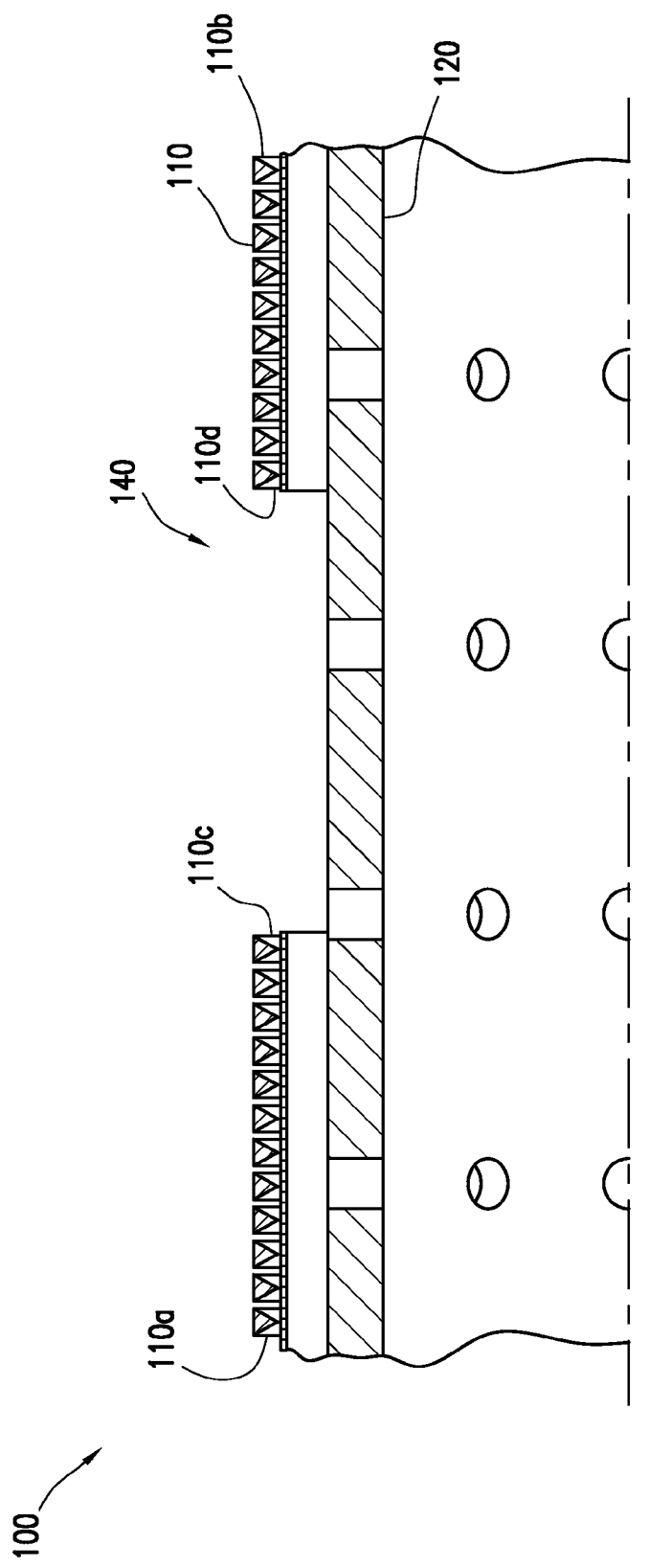
FIG. 3 is a cross-sectional view of the base pipe and wrap screen of the sand screen assembly with a section of the wrap screen cutout.

As shown in FIG. 3, the methods include removing at least one section of the wire wrap screen 110 at a location between the first and second ends 110a/110b. The removal of the section of screen creates a re-sizing area 140, a third end 110c, and a fourth end 110d. The re-sizing area 140 is located between the third end 110c and the fourth end 110d. The re-sizing area 140 can be created anywhere along the length of the wire wrap screen 110. For example, the re-sizing area 140 could be created in the middle of the length of screen or slightly off-set from the middle. There can also be more than one section of wire wrap screen 110 that is removed to create two or more re-sizing areas 140. If a second section of screen is removed, then this can create a fifth and sixth end (not shown), and so on for multiple sections located between the newly-created ends. For more than one re-sizing area 140, the areas can be created at different locations along the length of the wire wrap screen 110.

The methods include providing a first sealing ring 130a and a second sealing ring 130b. As discussed above, the sealing rings 130a/b have an initial I.D. that is greater than the O.D. of the wire wrap screen 110. In this manner, the sealing rings 130a/b are capable of traversing along a longitudinal axis (i.e., the length) of the wire wrap screen 110 without becoming stuck or catching on the screen. Therefore, the sealing rings 130a/b can be positioned onto the first end 110a of the wire wrap screen 110 and completely surround the screen after being positioned. According to certain embodiments, at least 2 sealing rings are used for each re-sizing area 140. For example, if there are 2 re-sizing areas 140, then at least a total of 4 sealing rings would be positioned onto the screen. If more than 2 rings are used, then each pair of rings can be positioned over the same or different ends of the screen. For example, the first and second sealing rings 130a/b can be positioned over the first end 110a, while a third and fourth sealing rings (not shown) can be positioned over the second end 110b.

Figure 4:
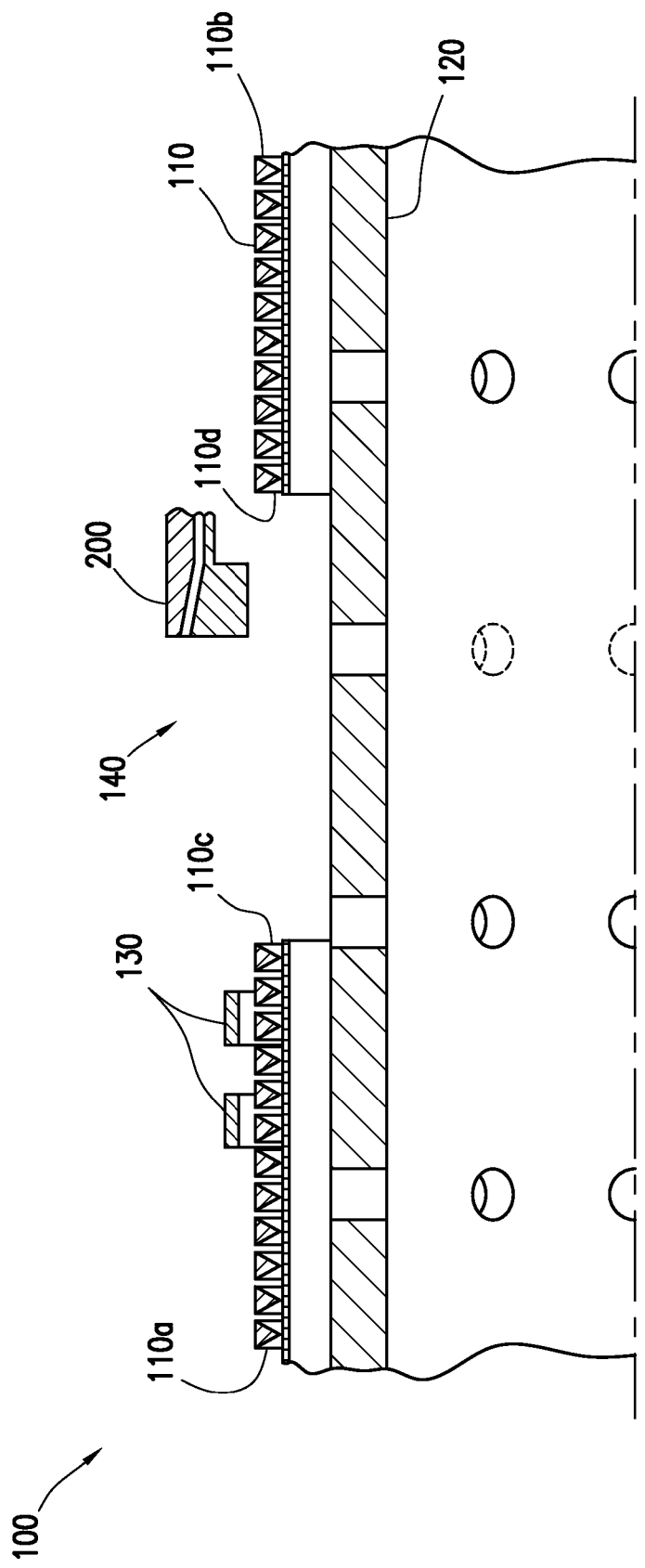
FIG. 4 is a cross-sectional view of the sand screen assembly with sealing rings and a re-sizing device.

As can be seen in FIG. 4, the methods include moving the first and second sealing rings 130a/b along a longitudinal axis of the wire wrap screen 110 to a location within the re-sizing area 140. The re-sizing device 200 (discussed above) can be located adjacent to the re-sizing area 140. In this manner, each of the sealing rings 130a/b can be positioned within the re-sizing device 200 after movement into the re-sizing area 140.

Figure 5:
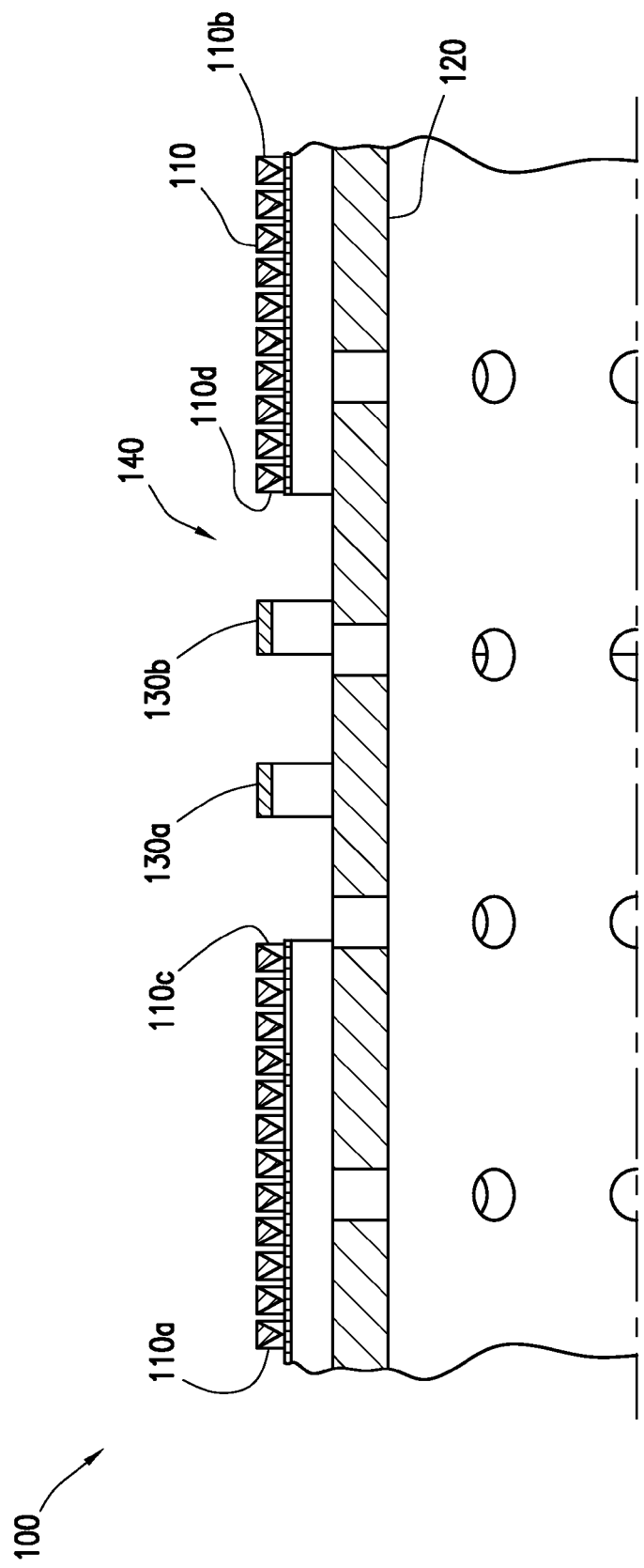
FIG. 5 is a cross-sectional view of the sand screen assembly with the sealing rings re-sized to a smaller outer diameter.

As can be seen in FIG. 5, the I.D. of the sealing rings 130a/b is reduced, for example, via the re-sizing device 200.

The reduced I.D. of the first and second sealing rings 130*a/b* is less than the O.D. of the third end 110*c* and fourth end 110*d*. It should be understood that the O.D. of the third end 110*c* does not have to be the same as the O.D. of the fourth end 110*d*. Therefore, the sealing rings 130*a/b* can be re-sized one at a time to account for any differences in the O.D. of the screen. For example, the I.D. of the first sealing ring 130*a* may need to be larger than the I.D. of the second sealing ring 130*b*. Therefore, the re-sizing device 200 can be set to produce the desired I.D. of each ring. The first sealing ring 130*a* can be re-sized to fit over the third end 110*c*, while the second sealing ring 130*b* can be re-sized to fit over the fourth end 110*d*. Of course if there are more than 2 rings and more than 1 re-sizing area, then each ring can be re-sized according to its own corresponding end of screen. As discussed above, the re-sized I.D. of each sealing ring can be calculated based in part on the predetermined interference for each ring.

Figure 6:
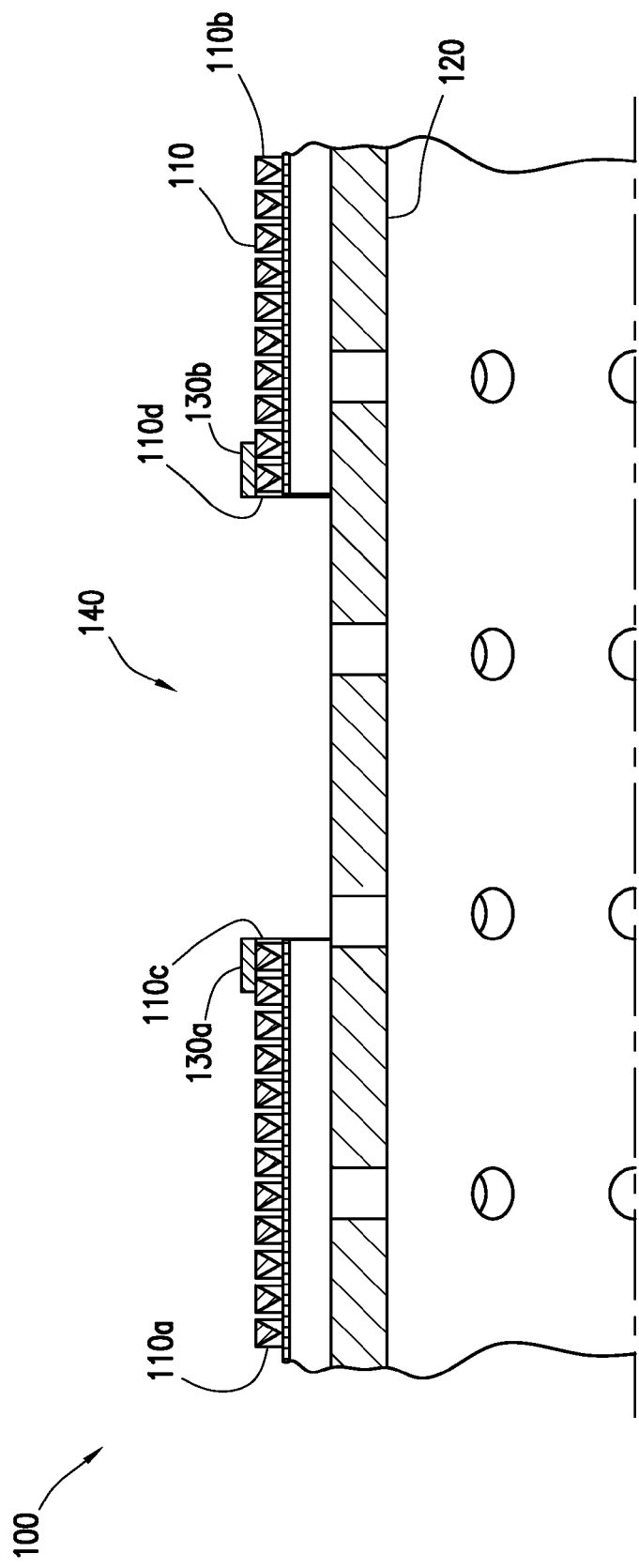
FIG. 6 is a cross-sectional view of the sand screen assembly with the sealing rings located at the ends of the wrap screen.

As can be seen in FIG. 6, each of the sealing rings are heated and then positioned over its corresponding end of wire wrap screen 110. For example, the first sealing ring 130*a* is positioned over the third end 110*c* and the second sealing ring 130*b* is positioned over the fourth end 110*d* of the wire wrap screen 110. The temperature of the sealing rings 130*a/b* is then allowed to decrease, wherein after the decrease in temperature, the sealing rings can create a seal at the third and fourth ends 110*c/d* of the screen.

The methods can further include attaching other components, such as a centralizer (not shown), onto or adjacent to the sealing rings 130*a/b*. Sealing rings can also be installed on the first end 110*a* and second end 110*b* of the screen as discussed above. The methods can further include using the base pipe and wire wrap screen assembly as part of a sand screen assembly in an oil or gas operation.

It is to be understood that it is not contemplated by this disclosure that the I.D. of any of the sealing rings are to be lathe-cut or turned in order to fit onto its end of screen. Therefore, it is not necessary and preferably the sealing rings are not milled, lathe-cut, turned, or any other synonymous term in order to fit over an end of the wire wrap screen. It will be appreciated by those of ordinary skill in the art that substantial time and money can be saved by utilizing the embodiments disclosed herein. It can be appreciated that by not having to lathe-cut the I.D. of the rings and by being able to form a jacket and then cut out a section of screen, time and money will be saved. Another benefit is that the sealing rings are reduced in size after any measurements of the O.D. of screen have been made. Therefore, the risk of having to strip away the screen, re-install a new sealing ring, and create a new wire wrap section is at best eliminated and at worst substantially reduced.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While apparatus (such as the packer assembly) and methods are described in terms of "comprising," "containing," or "including" various components or steps, the compositions and methods also can "consist essentially of" or "consist of" the various components and steps. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of installing a sealing ring onto a wire wrap screen comprising:
   providing the sealing ring, wherein the sealing ring has an initial inner diameter greater than the outer diameter of an end of the wire wrap screen;
   reducing the inner diameter of the sealing ring, wherein the reduced inner diameter of the sealing ring is less than the outer diameter of the end of the wire wrap screen;
   heating the sealing ring;
   positioning the heated sealing ring over the end of the wire wrap screen; and
   allowing the sealing ring to decrease in temperature.

2. The method according to claim 1, wherein the screen is a direct wrap screen.

3. The method according to claim 1, further comprising placing the sealing ring into a re-sizing device prior to reducing the inner diameter of the sealing ring.

4. The method according to claim 1, wherein the reduced inner diameter of the sealing ring is equal to the outer diameter of the end of the wire wrap screen minus a predetermined amount of interference of the sealing ring.

5. The method according to claim 4, further comprising measuring the outer diameter of the end of the wire wrap screen, predetermining the amount of interference of the sealing ring, and calculating the difference between the measured outer diameter of the end of the screen and the predetermined interference.

6. The method according to claim 5, further comprising calculating the amount of diametrical growth of the sealing ring based on the predetermined interference, wherein the sealing ring is heated to a final temperature that is based on a $\Delta T$ of the equation used to calculate the amount of diametrical growth, wherein $\Delta T$ is an increase in temperature.

7. The method according to claim 1, wherein the heating causes the sealing ring to expand.

8. The method according to claim 7, wherein the amount of expansion is at least sufficient such that the sealing ring is capable of being positioned over the end of the wire wrap screen.

9. The method according to claim 1, wherein the inner diameter of the sealing ring decreases during the decrease in temperature of the ring.

10. The method according to claim 9, wherein the decrease in inner diameter of the sealing ring is sufficient to create a seal between the inside of the ring and the outside of the screen.

11. The method according to claim 1, wherein the wire wrap screen is positioned around the outside of a base pipe.

12. A method of installing sealing rings onto a wire wrap screen comprising:

providing a jacket of wire wrap screen, wherein the jacket of screen is positioned around the outside of a base pipe, and wherein the jacket of screen initially has only a first and second end;

removing at least one section of the wire wrap screen from around the outside of the base pipe at a location between the first and second ends, wherein removal of the section of screen creates a re-sizing area, a third end, and a fourth end, wherein the re-sizing area is located between the third and fourth ends;

providing a first and second sealing ring, wherein the first and second sealing rings have an initial inner diameter greater than the outer diameter of the wire wrap screen;

positioning the first and second sealing rings onto the first end of the wire wrap screen, wherein the sealing rings completely surround the outside of the wire wrap screen after positioning;

moving the first and second sealing rings along a longitudinal axis of the wire wrap screen to a location within the re-sizing area;

reducing the inner diameter of the first and second sealing rings, wherein the reduced inner diameter is less than the outer diameter of the third and fourth ends of the wire wrap screen;

heating the first and second sealing rings;

positioning the first heated sealing ring over the third end of the wire wrap screen and the second heated sealing ring over the fourth end of the wire wrap screen; and allowing the first and second sealing rings to decrease in temperature.

13. The method according to claim 12, wherein the screen is a direct wrap screen.

14. The method according to claim 12, further comprising placing at least one of the first sealing ring and the second sealing ring into a re-sizing device prior to reducing the inner diameter of at least one of the first sealing ring and the second sealing ring.

15. The method according to claim 12, wherein the reduced inner diameter of at least one of the first sealing ring and the second sealing ring is equal to the outer diameter of the end of the wire wrap screen minus a predetermined amount of interference of at least one of the first sealing ring and the second sealing ring.

16. The method according to claim 15, further comprising measuring the outer diameter of the end of the wire wrap screen, predetermining the amount of interference of the sealing ring, and calculating the difference between the measured outer diameter of the end of the screen and the predetermined interference.

17. The method according to claim 16, further comprising calculating the amount of diametrical growth of at least one of the first sealing ring and the second sealing ring based on the predetermined interference, wherein at least one of the first sealing ring and the second sealing ring is heated to a final temperature that is based on a $\Delta T$ of the equation used to calculate the amount of diametrical growth, wherein $\Delta T$ is an increase in temperature.

18. The method according to claim 12, wherein the heating causes at least one of the first sealing ring and the second sealing ring to expand.

19. The method according to claim 18, wherein the amount of expansion is at least sufficient such that at least one of the first sealing ring and the second sealing ring is capable of being positioned over the end of the wire wrap screen.

20. The method according to claim 12, wherein the inner diameter of at least one of the first sealing ring and the second sealing ring decreases during the decrease in temperature of the ring.

21. The method according to claim 20, wherein the decrease in inner diameter of at least one of the first sealing ring and the second sealing ring is sufficient to create a seal between the inside of the ring and the outside of the screen.

22. The method according to claim 12, wherein the re-sizing area is created anywhere along the length of the wire wrap screen.

23. The method according to claim 12, wherein there is more than one section of wire wrap screen that is removed to create two or more re-sizing areas.

* * * * *